United States Patent Office 3,523,715
Patented Aug. 11, 1970

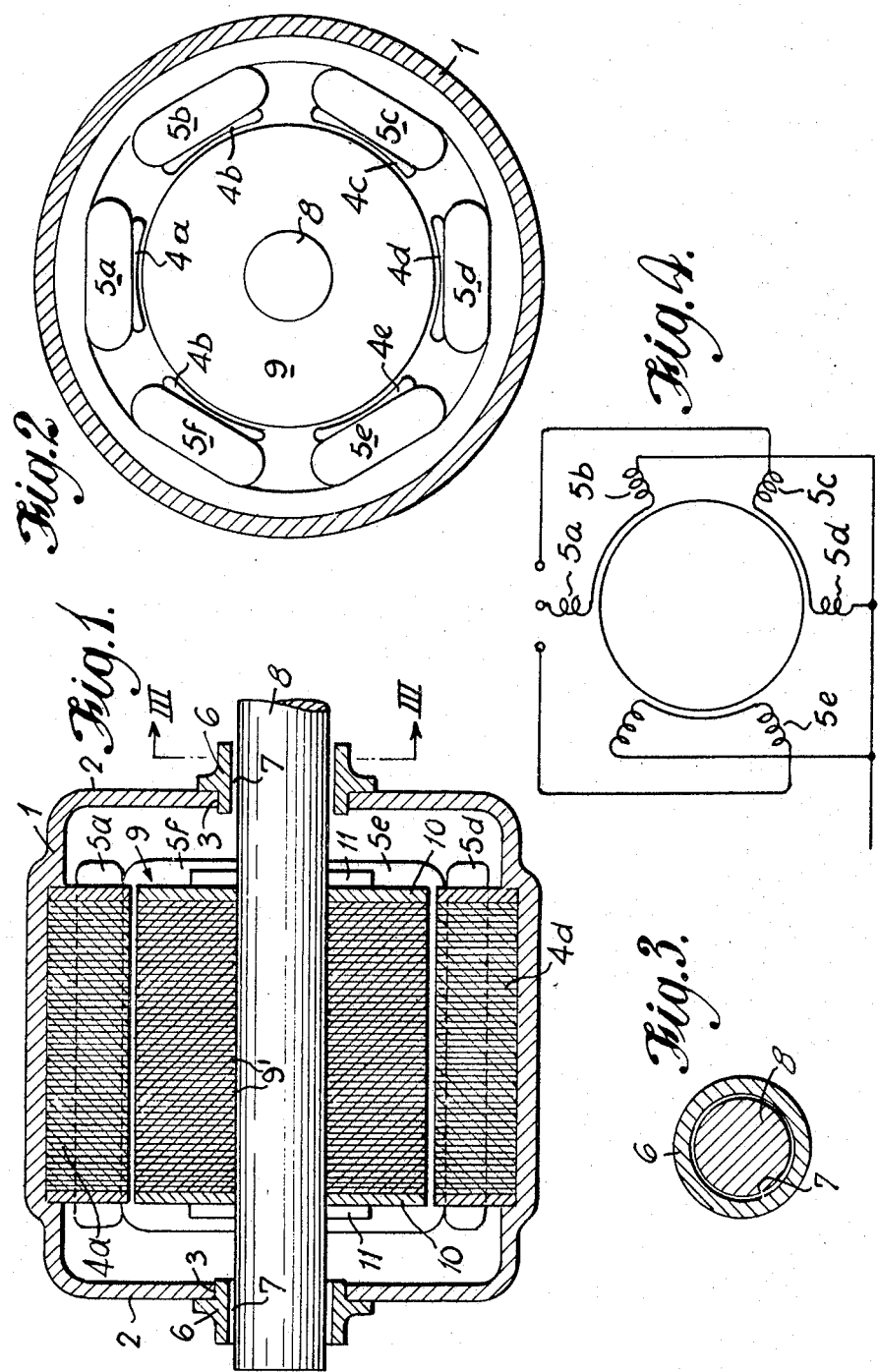

3,523,715
GAS BEARING
Herbert Sixsmith, Oxford, England, assignor to National Research Development Corporation, London, England, a British corporation
Filed Sept. 9, 1968, Ser. No. 758,227
Claims priority, application Great Britain, Sept. 18, 1967, 42,403/67
Int. Cl. F16c 39/06
U.S. Cl. 308—10    3 Claims

ABSTRACT OF THE DISCLOSURE

A shaft has a coaxial body of magnetically permeable material. Portions of the shaft at each end of the body are disposed in bearing sleeves. Six electromagnetic poles are disposed about the body. The arrangement is such that when a 3-plug A.C. supply is connected to the poles a rotating radial resultant force is imposed on the body which causes the axis of the shaft to rotate about a datum line whereby a gas bearing condition is created between the shaft at each of the bearing sleeves.

---

The present invention relates to gas bearings.

Gas bearings are known wherein a shaft is located with small clearance within a bearing sleeve. Upon rotation of the shaft at a high speed relative to the sleeve the shaft becomes spaced from the sleeve throughout its periphery and any tendency of a point on the surface of the shaft to approach the sleeve is resisted by the gas in the gas film between the shaft and sleeve. However, whilst the shaft is not rotating or is only rotating slowly, the shaft may not be borne free of the bearing sleeve by the gas film.

It is an object of the present invention to provide a gas bearing condition between two members which condition is created independently of any required relative motion between the two members.

According to the present invention there is provided a gas bearing, comprising first and second members having opposed surfaces and capable of being so disposed that there is a clearance between the opposed surfaces, electromagnetic means for causing vibration of the members one relative to the other in a direction including at least a component normal to said opposed surfaces, the arrangement being such that vibration of the members one relative to the other causes the pressure of gas between said opposed surfaces at a region spaced from the edges of said surfaces to oscillate about a pressure greater than the pressure of gas at the exterior of said opposed surfaces adjacent the edges of said opposed surfaces whereby the opposed surfaces are held in spaced relationship by the mean pressure of the gas in the gas film between the surfaces.

In one embodiment of the invention, one of the members is a shaft and the other of the members is a cylindrical sleeve encompassing a portion of the shaft and the said opposed surfaces are cylindrical surfaces and the said component is radial, that is, normal to a tangent to particular opposed regions of the cylindrical surfaces. In the simplest aspect of this embodiment wherein the shaft is horizontal, the vibration caused by the electromagnetic means may be solely in a vertical direction and in this case the shaft is held spaced from the bearing sleeve against the force of gravity. However, in cases wherein the shaft may be subjected to radial forces other than in a single direction, the electromagnetic means preferably create a radially directed force on the shaft, which force rotates about the axis of the shaft, whereby there is relative vibration in a radial direction between any point on the surface of the shaft and an adjacent point on the surface of the bearing sleeve and the axis of the shaft rotates about a datum line.

Conveniently, the electromagnetic means may be energised by 3-phase alternating current.

An embodiment of the present invention will now be described by way of example with reference to the accompanying drawing in which:

FIG. 1 is a view in axial section of an embodiment of the invention;

FIG. 2 is a view taken approximately on the line II—II in FIG. 1;

FIG. 3 is a cross section taken on the line III—III in FIG. 1; and,

FIG. 4 is a diagrammatic representation of the manner of winding and of the connection of the windings of the electromagnetic means included in the embodiment illustrated in FIGS. 1 and 2.

The embodiment of the invention illustrated in the drawing comprises a cylindrical housing 1 having end plates 2 in each of which there is centrally located an aperture 3, the two apertures 3 being aligned.

Mounted within the housing 1 are six pole pieces 4a–4f which are uniformly angularly disposed about the common axis of the apertures 3 in a manner similar to that of an electric motor. The pole pieces have windings 5a–5f, respectively, which are wound and connected in the manner illustrated in FIG. 4. The connection of the windings is such that two adjacent windings, i.e., 5a, 5b; 5c, 5d; 5e, 5f, are connected in series. This is in distinction to a motor having six pole pieces wherein the windings of diametrically opposite pole pieces are in series. The connection and/or winding of each of the members of the three pairs of windings is such that when the current is passed through the two windings of the pair the pole pieces of the pair are of opposite polarity. The three pairs of windings are connected one to each phase of a 3-phase A.C. supply.

Mounted partially within the apertures 3 are bearing bushes 6 which have coaxial cylindrical bearing surfaces 7.

A shaft 8 extends throughout the length of the housing 1 and outwardly of the housing through the bearing bushes 6. Mounted on the shaft 8 is a cylindrical body 9 formed of a plurality of lamina 9' of disc shape and formed of magnetically permeable material. The lamina 9' are held tightly together by plates 10 and collars 11 secured to the shaft 8. The body 9 has a length in the direction of the axis of the shaft 8 which, in the present embodiment, is approximately the same as the length of the pole pieces 4 in the same direction.

There is a small clearance between the portions of the shaft 8 located within the bearing bushes 6 and the bearing bushes 6 themselves and portions of the shaft adjacent the portions thereof illustrated as lying within the bearing bushes 6 are of the same diameter as the portions illustrated as lying with the bushes. In the present embodiment, the radial thickness of the clearance when the axis of the shaft 8 is coincident with the axis of the bushes 6 is 0.001 inch.

In operation, three phase alternating current, for example 50 c.p.s., is applied to the windings 5a–5f of the pole pieces 4a–4f. Energisation of the windings 5a–5f causes the pole pieces to create an oscillating flux, the path of which extends from one pole piece, e.g., 4a, 4c, 4e of each pair of pole pieces, across the air gap between the pole pieces and the body 9, through the body 9 and across the air gap to the other pole pieces 4b, 4d, 4f respectively, of each pair.

Thus at any instant, there may be three magnetic flux paths through the body 9.

With a sinusoidal E.M.F. the magnetic flux density B across the air gap between each pole piece and the body 9, varies sinusoidally at a frequency $\omega$. In poles $4a$ and $4b$ the flux density is:

$$B = B_0 \cos(\omega t - \alpha) \quad (1)$$

where $B_0$ is the peak flux density and $\alpha$ is the phase angle when $t=0$. If $\alpha=0$ when $t=0$, then $$B = B_0 \cos \omega t \quad (2)$$

The force F due to each pole varies as the square of the magnetic flux according to $$F = \frac{AB^2}{8\pi} \quad (3)$$

wherein A is the area of each pole face and B is the flux density.

Substituting for B in Equation 3, the value given in Equation 2:

$$F = \frac{AB_0^2}{8\pi} \cos^2 \omega t \quad (4)$$

$$= \frac{AB_0^2}{8\pi} (½ + ½) \cos^2 \omega t \quad (5)$$

Thus the force due to each pole is the vector sum of a steady component and an alternating component which oscillates at twice the frequency of the magnetic flux.

It is convenient to write:

$$\frac{AB_0^2}{8\pi} = F_0 \quad (6)$$

Equation 5 may now be written:

$$F = F_0(½ + ½) \cos^2 \omega t \quad (7)$$

If the flux density in poles $5a$ and $5b$ reaches a maximum positive value when $\alpha=0$ and $t=0$, then:

$$F_{5a} = F_{5b} = F_0 \cos^2 \omega t \quad (8)$$

The flux density in poles $5e$ and $5f$ reaches a maximum negative value when $\omega t=60°$, and the flux in poles $5c$ and $5d$ reaches a maximum positive value when $\omega t=120°$. Thus:

$$F_{5c} = F_{5d} = F_0 \cos^2(\omega t - 120°) \quad (9)$$

similarly;

$$F_{5c} = F_{5b} = F_0 \cos^2(\omega t - 240) \quad (10)$$

Several values of F for four values of $\omega t$ are shown in the table below. The radial force rotates at twice the frequency at the A.C. supply and in the opposite direction.

and bearing surface, is less than the thickness of the air inflow path when the pressure is less than atmospheric, i.e. when the shaft and bearing surfaces are spaced by a distance greater than their mean spacing. Since the resistance to inflow or outflow to gas is proportional to the reciprocal of the cube of the spacing, it follows that there will be an increase in the pressure at or adjacent the middle of the axial length of the bearing bush until the pressure differential between the middle region of the bearing bush and the end edges of the bearing bush is such as to prevent any further net inflow of air to the middle region.

In a particular example of apparatus in accordance with the present invention constructed as described above and wherein the mean clearance between the shaft surface and the bearing surface is 0.001 inch, a continuous gas film is formed the moment the current is switched on and the shaft becomes free to rotate and to move axially with no perceptible friction.

When the shaft of the illustrated embodiment is mounted horizontally there is, of course, the downwardly directed gravitational force on the shaft which causes the axis of the shaft to rotate about a line displaced downwardly from the axis of the bearing surfaces 7. Thus, the mean clearance between the shaft surface and the bearing surface at the underside of the shaft is less than the mean cleanance at the upperside of the shaft. Hence, the mean air gap between the body 9 and the pole pieces at the underside of the body 9 is less than the mean air gap at the upperside of the body.

The cyclic variation in the thickness of the gas film expressed as a fraction of the film thickness is increased around the lower half of the bearing and is reduced around the upper half of the bearing. Consequently, the cyclic variation in both the film pressure and the film resistance is increased around the lower half of the bearing and is reduced around the upper half of the bearing. Hence, there is a stronger "pumping" action at the underside of the shaft. The mean pressure at the underside of the shaft within the bearing sleeves is therefore greater than the mean pressure at the upperside of the shaft so that the weight of the shaft 8 and body 9 is balanced and the shaft is borne free of the bearing surfaces through out its periphery.

Whilst the example of the manner in which the gravitational force is overcome has been described above, any

| Pole | Magnetic phase | Values of Force F | | | |
|---|---|---|---|---|---|
| | | $\alpha=0$ $\omega t=0$ | $\alpha=0$ $\omega t=30°$ | $\alpha=0$ $\omega t=60°$ | $\alpha=0$ $\omega t=90°$ |
| 5a | $\omega t - \alpha$ | $F_0 \cos^2 0 = F_0$ | $F_0 \cos^2 30° = ¾ F_0$ | $F_0 \cos^2 60° = ¼ F_0$ | $F_0 \cos^2 90° = 0$ |
| 5b | $\omega t - \alpha$ | | | | |
| 5c | $\omega t - \alpha - 120°$ | $F_0 \cos^2(-120°) = ¼ F_0$ | $F_0 \cos^2(-90°) 0$ | $F_0 \cos^2 -60° = ¼ F_0$ | $F_0 \cos^2 -30° = ¾ F_0$ |
| 5d | $\omega t - \alpha - 120°$ | | | | |
| 5e | $\omega t - \alpha - 240°$ | $F_0 \cos^2 -240° = ¼ F_0$ | $F_0 \cos^2 -210° = ¾ F_0$ | $F_0 \cos^2 -180° = F_0$ | $F_0 \cos^2 -150° = ¾ F_0$ |
| 5f | $\omega t - \alpha - 240°$ | | | | |

It will be realised that the several forces acting on the body 9 may be regarded as a single radially directed force and this single force rotates at twice the frequency of the A.C. supply and in the opposite direction. The body 9 is moved at any instant in the direction of the force at that instant.

Movement of the body 9 and with it the shaft 8 causes what may be regarded as a pumping action between any two radially opposite points on the shaft surface and bearing surface 7. The pressure at any point in the gas film between the shaft and bearing surface oscillates about atmospheric pressure. Considering a region of the gas film spaced from the ends of the bearing surfaces 7, when the pressure is greater than atmospheric, i.e., when the shaft and bearing surfaces are spaced by a distance less than their mean spacing, the thickness of the escape path for the air, i.e., the clearance between the shaft surface force acting radially of the shaft is overcome in a similar manner.

When the windings $5a$ to $5f$ are energized, the shaft may be rotated without opposition from the fields generated by the windings.

If the body 9 were to be made longer or shorter than the poles $4a$ to $4f$ then the shaft 8 could be moved axially whilst the windings $5a$ to $5f$ are energised. If the shaft 8 is moved axially so that one end of the body 9 is located within the compass of the pole pieces $4a$ to $4f$ there is an axially directed force tending to move the body to a position in which an end or the ends of the body is or are approximately coplanar with the end or ends of the pole pieces or to a position in which the ends of the body project axially away from the ends of the pole pieces.

The embodiment of the invention described above is of use, for example, where it is desired to create a bearing, in the absence of lubricant, when the shaft is not intended to be rotated or is only rotated slowly. As an example of uses where bearings are desired without lubricant may be mentioned reciprocating compressors which either are required to provide compressed gas which is totally free of contaminant or reciprocating expanders which operate at such low temperatures that lubricant cannot be used. For example the axis of the piston or the cylinder or of each piston or cylinder of the compressor may be caused to rotate about a datum line by apparatus in accordance with the present invention so that a gas bearing is cretaed between the piston and cylinder or each piston and cylinder. This arrangement is particularly suitable for high speed compressors wherein the leak path between the piston and cylinder is of small importance.

Whilst the invention has been described above in an embodiment wherein three-phase current is used and the bearings are capable of overcoming any radially directed forces acting on the shaft, it may be that a shaft is only to be subjected to forces in a single radial direction. In this case only two windings and pole pieces may be included with the pole pieces aligned on a diameter along which the force on the shaft is known to act. Single phase alternating current would, in this case, be used as the power.

Similarly, it is to be understood that any number of phases may be employed.

Embodiments of the invention have been described above which include shafts and cylindrical bearing surfaces. The invention is not limited to such arrangements. The invention may be embodied in arrangements wherein two members have opposed planar surfaces which are to be held in spaced relationship in a manner which allows substantially friction-free movement of the two members, one relative to the other, in directions parallel to the planar surfaces. In such cases one of the members is provided with an electromagnet to which alternating current is applied. The other of the members is provided with a body of magnetically permeable material. The arrangement is such that there is vibrational movement of the two members, one relative to the other, in a direction normal to the planes of the opposed surfaces. The vibrational movement of the two members, one relative to the other, causes a gas film to be created between the opposed surfaces with a mean pressure greater than atmospheric whereby the two members are held in spaced relationship allowing friction free relative movement between the two members in direction parallel to the two opposed surfaces.

The invention may also be embodied in an arrangement which constitutes both a journal and a thrust bearing. For example, a shaft may be provided with a conical surface coaxial with the shaft. A stator member surrounding the shaft is provided with a similar conical surface of similar cone angle and disposed in mating relation with the conical surface associated with the shaft. The "stator" member is provided with electromagnetic means and the shaft is provided with a body of magnetically permeable material. The arrangement is such that the shaft and its conical surface are vibrated in a direction either radially of the shaft or axially of the shaft. Vibration of the shaft relative to the stator causes the above described pumping action between the opposed conical surface whereby the conical surfaces are held in spaced relationship and the shaft can be rotated relative to the "stator" substantially without friction from the bearings. Any force on the shaft tending to move the conical surfaces closer together is opposed by the pressure of the air in the air film between the conical surfaces since the mean pressure increases upon a decrease in the mean spacing of the surfaces.

Whilst in the embodiment specifically described above it is the member having the external cylindrical surface which is caused to vibrate relative to the member having the internal cylindrical surface, it is to be understood that the member having the external cylindrical surface could be held stationary and the member with the internal cylindrical surface could be caused to vibrate.

I claim:

1. A gas bearing including first and second members having opposed cylindrical surfaces and adapted so that there may be a clearance space between said opposed surfaces, electromagnetic means adapted to provide a magnetic force normal to and rotating about the axis of said cylindrical surfaces whereby to cause one of said members to vibrate relative to the other member whereby the pressure of gas between said opposed surfaces at a region spaced from the edge of the clearance space is caused to oscillate about a pressure greater than the pressure of gas at the exterior of the clearance space and the opposed surfaces are held in spaced relationship by the mean pressure of the gas film in the clearance space.

2. A gas bearing as claimed in claim 1 wherein the first member has an external cylindrical surface and the second member has an internal cylindrical surface and the electromagnetic means is adapted to vibrate said first member relative to said second member.

3. A gas bearing according to claim 1, wherein said electromagnetic means includes six pole pieces disposed uniformly about the line of the axis of said cylindrical surfaces, said six pole pieces being arranged in three pairs with the pole pieces of each pair being immediately adjacent one another and connected in series whereby, when energised, said pole pieces of a pair are of opposite polarity, said pairs of pole pieces being adapted for connection one to each of the phases of a 3-phase A.C. supply, and a body of magnetically permeable material disposed in the general radial plane of said pole pieces, said pole pieces being associated with one of said members and said body of magnetically permeable material being associated with the other of said members.

References Cited

UNITED STATES PATENTS

| | | | |
|---|---|---|---|
| 3,171,696 | 3/1965 | Houghton | 308—9 |
| 3,167,669 | 1/1965 | Bodine | 310—10 |
| 3,018,142 | 1/1962 | Warnock | 308—9 |

FRED C. MATTERN, Jr., Primary Examiner

F. SUSKO, Assistant Examiner